Feb. 20, 1923.                                   1,446,061.
C. R. PRATT.
CHUCK.
FILED OCT. 18, 1919.                          3 SHEETS—SHEET 1.
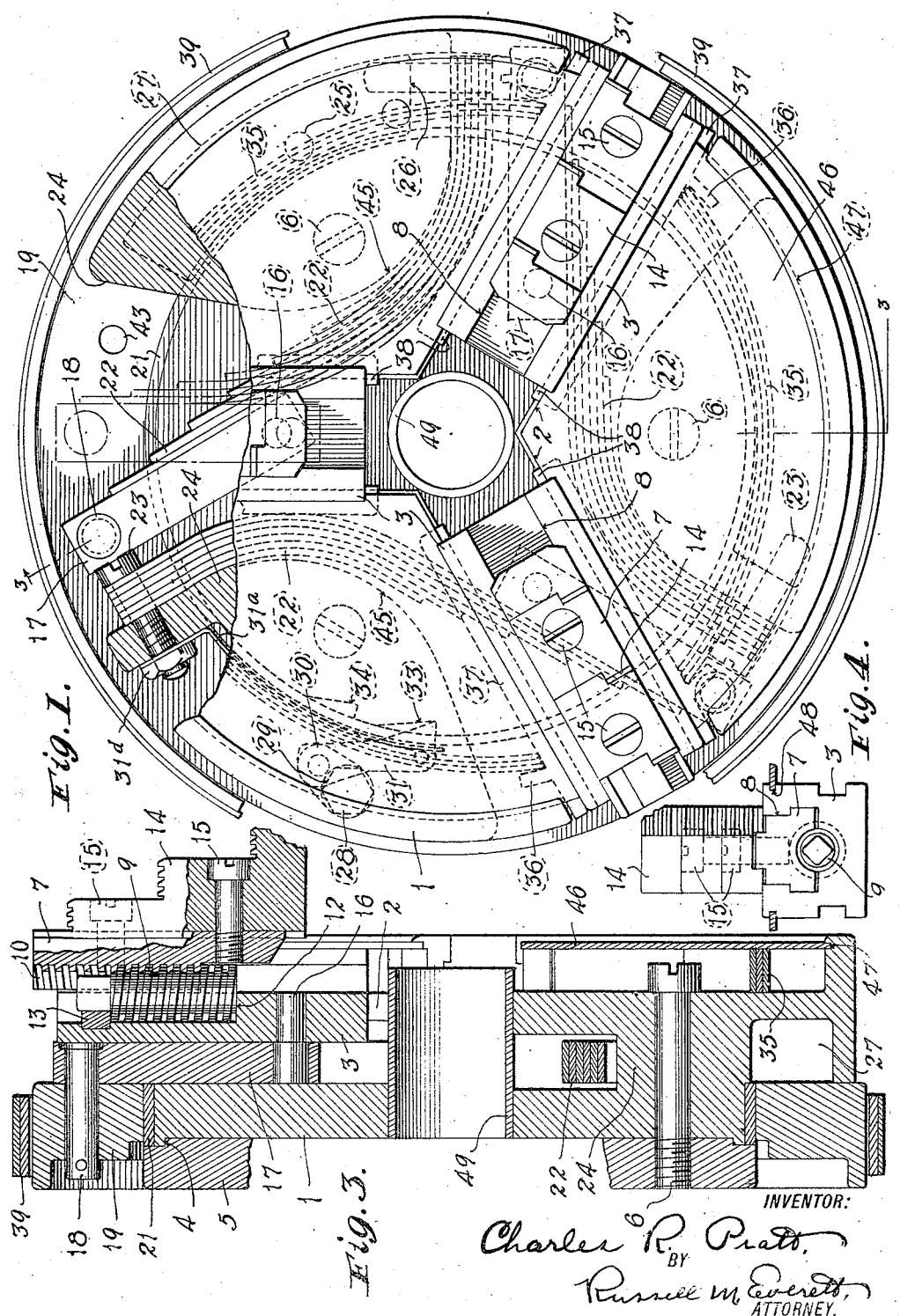
INVENTOR:
Charles R. Pratt,
BY
Russell M. Everett,
ATTORNEY.

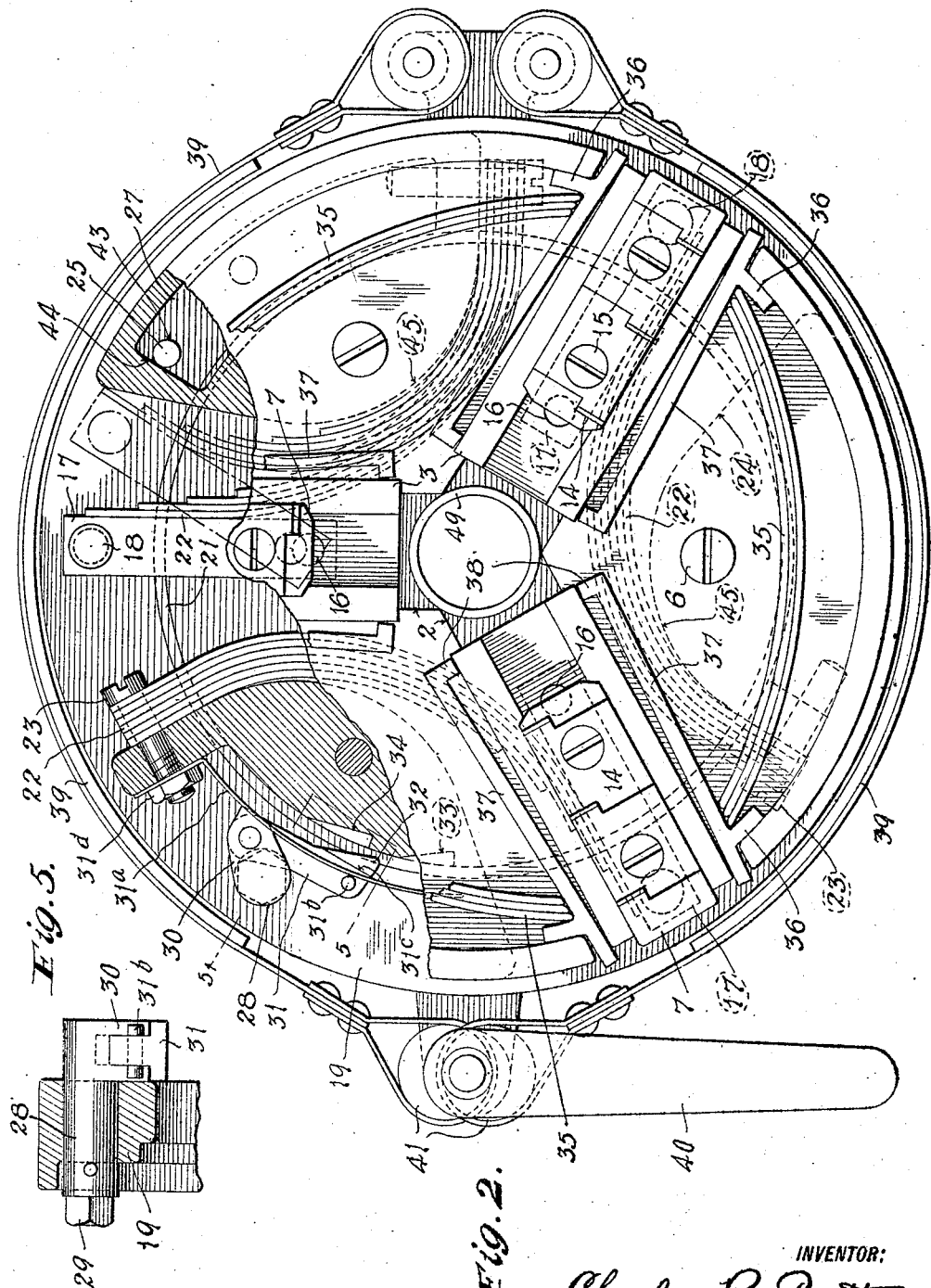

Feb. 20, 1923.

C. R. PRATT.
CHUCK.
FILED OCT. 18, 1919.

Inventor:
Charles R. Pratt.
by Emery Booth Janney Varney.
Attys

Patented Feb. 20, 1923.

1,446,061

UNITED STATES PATENT OFFICE.

CHARLES R. PRATT, OF MONTCLAIR, NEW JERSEY, ASSIGNOR TO THE E. HORTON & SON COMPANY, OF WINDSOR LOCKS, CONNECTICUT, A CORPORATION OF CONNECTICUT.

CHUCK.

Application filed October 18, 1919. Serial No. 331,618.

*To all whom it may concern:*

Be it known that I, CHARLES R. PRATT, a citizen of the United States and a resident of Montclair, in the county of Essex and State of New Jersey, have invented new and useful Improvements in Chucks, of which the following is a specification.

This invention relates to a machine chuck for holding work in a lathe, boring mill, grinder or the like.

The objects of the preferred embodiment of my invention herein specifically described and illustrated are to provide an improved chuck adapted for both external and internal chucking, that is, to grip the work on the outside thereof, or to grip the inside walls of a recess or bore in the work; to provide a chuck which can also be utilized for rotating work on centers and to accommodate itself to eccentric work surfaces; to provide toggle means for operating the jaws of the chuck simultaneously and for accurately centering the work; to secure a uniform jaw pressure upon all sizes of work within the capacity of the chuck; to adapt the invention to quick insertion and removal of the work at speed or at rest; to secure high efficiency and a simple, inexpensive and durable construction; and to obtain other advantages and results as may be brought out in the following description.

Referring to the accompanying drawings, in which like numerals of reference indicate the same parts throughout the several views, Figure 1 is a front elevation of a chuck embodying my invention, showing the parts thereof in position for internal chucking, portions being broken away;

Figure 2 is a similar view, showing the parts of the chuck in position for external chucking;

Figure 3 is a transverse vertical view through the chuck on line 3—3 of Fig. 1;

Figure 4 is an end view of one of the jaws removed from the chuck;

Figure 5 is a horizontal sectional view on the line 5—5 of Fig. 2.

Figure 6:
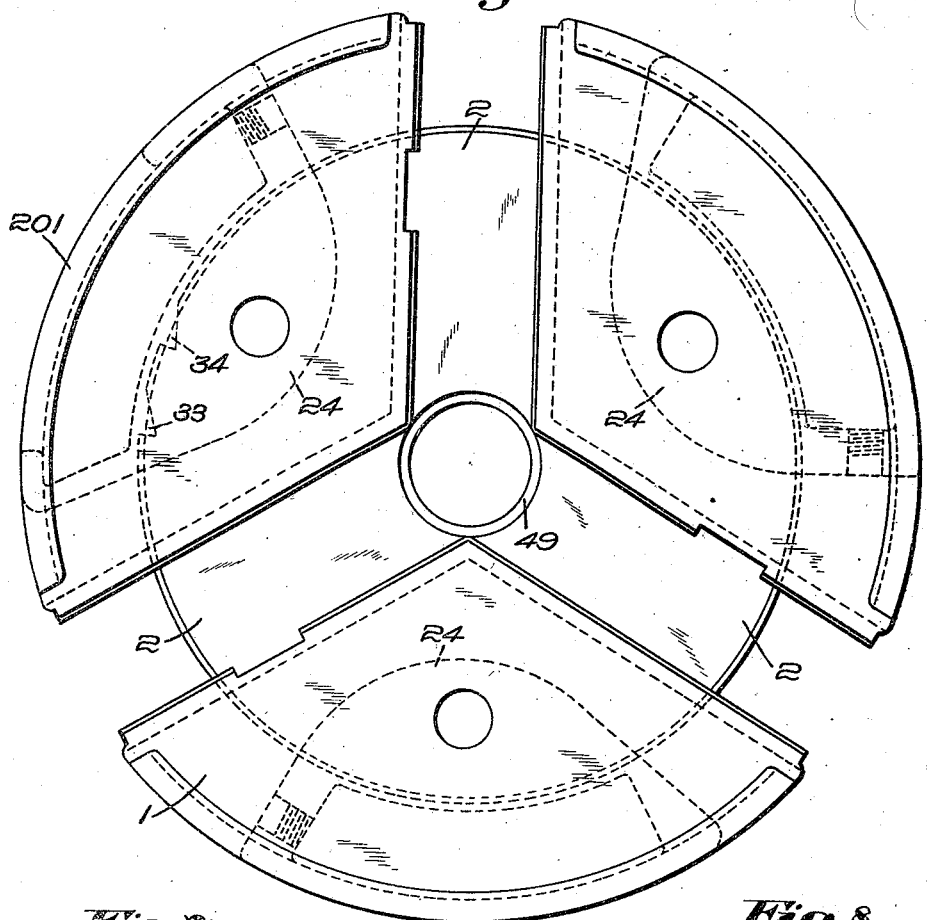
Figure 6 is a front elevation of the chuck body casting.
Figure 7:
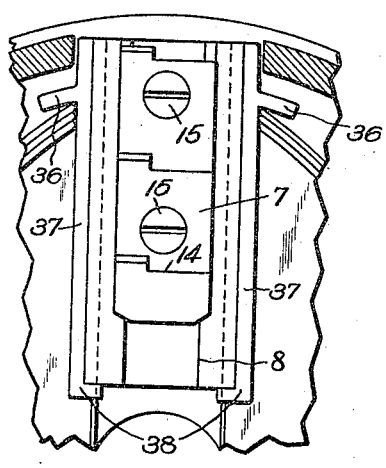
Figure 7 is an elevation, partly in section, showing the latch bars on the sides of a jaw slide.
Figure 8:
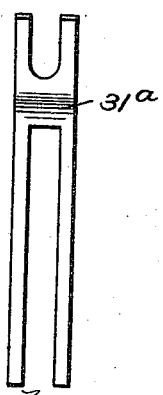
Figure 8 is an end elevation of the slotted spring leaf 31ª.

Specifically describing the present embodiment of the invention the numeral 1 designates the body of the chuck having in its face radial guideways 2 which receive jaw slides 3 which extend substantially the full length of the guideways 2, thus providing a large bearing surface and great strength, the back of the chuck being provided with an annular recess 4 to receive an adapter 5 which is secured to the chuck by means of bolts 6. The jaw slides 3 each receive an adjustable jaw 7 slidable in guideways 8 formed in the faces of the jaw slides 3 by means of screws 9 mounted in longitudinal semi-circular grooves 10 in the backs of the jaws 7. The screws 9 are held against longitudinal movement relative to the slides by abutments 12 in the slides 3 and by half collars 13 in said slides the half collars engaging the tops of the screws 9. A reversible and removable stepped jaw face 14 is secured to the front of each adjustable jaw 7 by means of screws 15, the said jaw faces being reversible for the purpose of adapting them to either external or internal chucking, and being shown in Figure 2 as applied to the adjustable jaws 7 for external chucking. These jaw faces may be formed of hardened steel with roughened faces for chucking rough work, and are interchangeable for soft metal jaws properly shaped for chucking finished or precision work.

The jaws 7 are adjustable relatively to the slides 3 to accommodate large variations in the diameter of the work inserted in the chuck, and the slides 3 are in turn movable in the guideways 2 to quickly grip and release the work after the rough adjustment of the jaws 7 by the screws 9. For these purposes each slide 3 is shown as connected by means of a pivot pin 16 to one end of a toggle 17 arranged at the back of the chuck, the opposite ends of said toggles being pivotally connected by pins 18 to a centering ring 19 rotatable upon the body of the chuck, which produces simultaneous movement of the jaws of the chuck and accurately centers them. This ring 19 is mounted upon a removable bushing 21 which is held in position on the body of the chuck by means of the adapter 5. Engaging each of these toggles is a leaf spring 22, one end of which engages the toggle, while the other end thereof is secured by means of a screw 23 to an upstanding boss 24 projecting from the body of the chuck between the jaws. Strut springs 35 have their opposite ends engaging under lugs 36 projecting from latch bars 37, one of which is arranged upon each side of each jaw slide 3 and slidable in the chuck body. Each latch bar 37 is provided at its lower end with a hook 38 which is adapted to slip under and engage the inner end of the adjacent jaw slide 3.

For internal chucking the parts of the chuck are disposed as shown in Figure 1, each toggle when the jaws are in released position being disposed at substantially its radial position, and movement past the radial position being prevented by means of a pin 25 inserted through the centering ring 19 which is adapted to engage one end wall 26 of a recess 27 formed in the back of the body of the chuck. The positions of the toggles when the jaws are at their inner limits and fully open for internal chucking, are indicated on the broken away portions of Figure 1 by dotted lines, while the normal and clamping position of the toggles, in which position the jaws are moved to their outer limit to grip work, is indicated by full lines, movement of the toggles toward their clamping positions being limited by the toggles engaging the bosses 24. The toggles can be moved from their clamping position into their releasing position against the action of the leaf springs 22 and strut springs 35 either manually or through the power of the lathe or machine to which the chuck is applied. For the purpose of moving the toggles to their releasing position and retracting the jaws inwardly through manual operation, a crank shaft 28 is journaled in the centering ring 19 and is provided at the outer end thereof with a polygonal heal 29 adapted to receive a conventional socket wrench, and at the inner end thereof with a crank arm 30 which is pivotally connected to one end of a pawl 31, the opposite end of which is provided with an angular shoulder 32 adapted to engage either one of the two notches 33 and 34, respectively, formed in the body 1 of the chuck. A spring leaf 31$^a$ is provided for the pawl 31 to hold the same in or out of engagement with said notches 33 and 34, said spring leaf having one end passing between a stud 31$^b$ and a shoulder 31$^c$ on the pawl and having the other end slotted to slide under a nut 31$^d$ on the adjacent screw 23. The screw 23 may be turned by a screw driver inserted through the adjacent peripheral slot in the chuck body between the bosses 24, and the spring may be slid in and out beneath the nut on this screw, when loosened by the finger of the operator or a screw driver inserted through the opening 201 (Fig. 6) in the periphery of the chuck body. When the spring is slid on said screw toward the center of the chuck the pawl is held in one of said notches, while when the spring is slid in the opposite direction the pawl is held out of engagement with the notches to allow operation of the centering ring by power as hereinafter described. For internal chucking the shoulder 32 of this pawl is inserted in the notch 33, and rotation of the crank shaft toward the center of the chuck will obviously cause a rotation of the centering ring to swing the toggles from the solid line position in Figure 1 to the dotted line position, which action simultaneously moves all of the jaws inwardly toward the center of the chuck against the action of the leaf springs 22 and strut springs 35, the movement of the centering ring being limited by engagement of the stop pin 25 with the end 26 of the recess 27. As the jaws move inwardly the latch bars are compelled to move with the jaws by virtue of the hooks 38, and this action causes the strut springs 35 to be flexed and put under pressure. After the work has been placed in the jaws the crank shaft 28 is released, whereupon the springs 22 and 35 will force the toggles into their solid line positions to move the jaws into firm engagement with the work.

This manual actuation of the centering ring 19 is utilized when loading or unloading the chuck at rest, and for the purpose of loading and unloading the chuck at speed, or when the same is rotating, a brake band 39 is arranged about the centering ring 19 and engages the periphery thereof, the said brake band being operated by any suitable means fixed to the machine upon which the chuck is used, such as the handle and eccentrics 40 and 41 respectively. Before attempting to load or unload the chuck at speed the pawl 31 must be thrown out of operation by the spring 31$^a$. Assuming the chuck to be rotating and driven by the machine, if the brake band 39 is tightened about the centering ring 19, the body of the chuck will be rotated in a counter clockwise direction (facing the chuck) relatively to the centering ring 19 which will be retarded or stopped. This action will cause the toggles to move from their solid line or clamping positions to their dotted line or releasing positions, which will flex the leaf springs and the strut springs and retract the jaws toward the center of the chuck. When the brake band is released the leaf springs and strut springs will force the jaws outwardly into their clamping positions to engage work placed upon the jaws.

For external chucking the positions of the parts of the chuck are indicated by Figure 2, the releasing positions of the toggles being indicated by dotted lines, while the normal or clamping positions of the toggles are indicated by solid lines in the broken away portion of the figure. When in clamping position the toggles are in substantially radial positions, and movement past the radial position is limited by means of the pin 25 inserted through an opening 43 in the centering ring and adapted to engage the opposite end wall 44 of the recess 27 in the body of the chuck. When using the chuck for external chucking the latch bars 37 are disengaged from the jaws, which can be accomplished in any suitable manner, such as inserting a screw driver or other tool under the hooked ends 38 thereof and forcing them away from the slides 3, the pressure of the strut springs then forcing them outwardly. It will be noted that the outward movement of the latch bars 37 is limited by engagement of the lugs 36 with the body of the chuck. For loading and unloading the chuck at rest for external chucking, the pawl is inserted in the notch 34 in the body of the chuck, and the toggles can then be moved from their clamping positions against the action of the leaf springs 22 by rotation of the crank shaft 28 with a conventional socket wrench, as shown and explained in connection with internal chucking. It will be noted that when the toggles are in their dotted line or releasing positions as shown in Figure 2, the leaf springs are much more flexed than when the toggles are in the releasing positions when the chuck is used for internal chucking, and the leaf springs are bent around the curved walls 45 of the bosses 24 so that the leaf springs are put under greater pressure. It will thus be seen that as the leaf springs are flexed about the bosses by the toggles their working lengths are shortened, and their pressure against the toggles consequently increased, the varying leverage of the toggles as they move from their dotted line positions to the clamping radial positions being thus compensated for, so that a substantially uniform pressure is exerted on the jaws during their whole movement. It is to be noted that the pressure of the leaf springs 22 as they are flexed around the bosses 24 varies in inverse ratio to the leverage of the toggles, so that work of various diameters will thus be gripped by the jaws with uniform jaw pressure, irrespective of the differences in the diameter. The chuck can be loaded and unloaded at speed in substantially the same manner as above described in connection with the internal chucking, the retardation of the centering ring by the brake band causing the toggles to be moved from their radial or clamping positions against the action of the leaf springs to their dotted or releasing positions, movement of the toggles in this direction being limited by engagement with the bosses 24. When the brake band is released the leaf springs will force the toggles into their radial positions and the jaws into their clamping positions, the movement of the toggles toward the radial position being limited by the stop pin 25 in the centering ring engaging the end 44 of the recess 27. It will be noted with reference to Figure 4 that when the removable jaw faces 14 are fastened to the adjustable jaws 7 by the screws 15, the jaw faces are forced into tight engagement with the slides 3, and the adjustable jaws 7 are also drawn into tight engagement with their guideways in the slide 3. Thus, by applying jaw pressure to the work before tightening the screws 15 all back-lash or lost motion between the toggles, the various jaws and the work is eliminated, and great precision obtained in centering the work. This eliminates the necessity of centering every piece of work by adjusting each jaw separately at every chucking operation, as is the universal custom.

As has been pointed out, when the chuck is being used for internal chucking the leaf springs 22 are not so greatly flexed by the toggles as when externally chucking, so that their pressure upon the toggles is not as great as when the chuck is used for external chucking and their pressure constantly weakens as they straighten out. Consequently the strut springs 35 are utilized to produce substantially the same pressure upon the jaws when they are used for internal chucking as when used for external chucking. In this connection, it will be understood that a spring such as the strut springs 35 loaded endwise possesses the peculiar function of producing a uniform resistance throughout all degrees of bending, as the leverage to flex it increases in proportion to its increasing fibre stress. The pressure of the leaf springs serves to throw the toggles off their dead centers or radial positions and then the strut springs come into action radially upon the jaws to produce a uniform pressure throughout their movement. Adjustment of the pressure of the leaf springs 22 can be accomplished by tightening or loosening the anchor screws 23, and various pressures of strut springs can be obtained by changing the springs. In external chucking operations the leaf springs 22 are the sole power for actuating the jaws to their clamping positions, the said springs directly engaging the toggles. In internal chucking operations, the leaf springs which are too weak to produce sufficient clamping pressure, serve to throw the toggles off dead center and start the jaws outwardly, the strut springs then exerting the necessary uniform pressure radially on the jaws to clamp the work.

For the purpose of adapting the chuck to receive and rotate work held on centers or eccentric work surfaces, the removable bushing 21 upon which the centering ring 19 is mounted, is removed. This produces a floating or loose mounting of the centering ring 19 on the chuck, so that the various jaws can adjust themselves to the work with a substantially uniform jaw pressure, as described in connection with my copending application Serial No. 316,319 filed August 9, 1919. The ring 19 is thus bodily movable in a plane parallel to the plane of the chuck, and allows the jaws to adjust themselves to work held on centers, and eccentric work surfaces. It will be noted that the necessity for a spring floating or centering ring, as shown in said copening application, is obviated in the present invention by the use of the leaf and strut springs 22 and 35, respectively, which constantly exert a yielding pressure on the jaws when work is clamped in the chuck.

It will thus be seen that the chuck is adaptable for both internal and external chucking work without alterations or additions thereto, and by merely changing the position of the centering ring 19, and either connecting the latch bars 37 with or disconnecting them from the slides 3. To connect the said latch bars with the slides 3, it is merely necessary to force them inwardly toward the center of the chuck until the hooks 38 approach the inner ends of the slides, when the pressure of the strut springs 35 will cause the hooks to snap under the ends of the slides. Furthermore, the jaws are forced into clamping position in both internal and external chucking operations by spring power, and the peculiar cooperation of the leaf springs 22 and strut springs 35, enables such operation. Removable cover plates 46 are fitted into grooves 47 and 48 in the rim of the chuck body and in the sides of the slides 3, respectively, to enclose the strut springs and prevent dirt or turnings from getting into the chuck. A bushing or sleeve 49 is also inserted through the opening in the center of the chuck to exclude dirt and foreign matter from the toggles and leaf springs.

Obviously, many modifications and changes may be made in the construction of my chuck by those skilled in the art without departing from the spirit and scope of the invention, and I do not wish to be understood as restricting myself except as required by the following claims when construed in the light of the prior art.

Having thus described the invention, what I claim is:

1. A chuck including, a body portion, movable jaws mounted thereon, spring means and cooperating mechanism between said spring means and said jaws for alternatively actuating said jaws toward the axis of the chuck for external chucking or from the axis of the chuck for internal chucking.

2. A chuck including, a body portion, movable jaws mounted thereon, spring means and cooperating mechanism between said spring means and said jaws for actuating said jaws alternatively either toward or from the axis of the chuck body with substantially uniform jaw pressure throughout the movement thereof.

3. A chuck including, a body portion, movable jaws mounted thereon, spring means for moving said jaws toward the axis of said chuck body for external chucking, and changeable connections permitting operation of said spring means for actuating said jaws in the opposite direction for internal chucking.

4. A chuck, comprising, in combination, a body, a jaw, and a flexing spring urging said jaw into work-engaging position, said spring having a support providing a progressively advancing fulcrum as the spring is flexed, thereby progressively to shorten the effective length of the spring during flexure thereof and progressively to lengthen the spring during reactive movement thereof.

5. A chuck comprising, in combination, a body, a jaw, a flexing spring urging said jaw into work-engaging position, and a support for said spring formed to provide advancing and receding points of ultimate contact with said spring whereby as said spring is flexed in contact with its support its effective length is shortened, and whereby as said spring reacts its effective length is lengthened.

6. A chuck comprising, in combination, a jaw, a toggle connected to said jaw and a spring of the cantilever type extending lengthwise of said toggle exerting force to swing said toggle and urge said jaw in work-engaging direction.

7. A chuck comprising, in combination, a jaw, a toggle connected to said jaw and a spring of the leaf type extending lengthwise of said toggle exerting force to swing said toggle and urge said jaw in work-engaging direction.

8. A chuck comprising, in combination, a jaw, a toggle connected to said jaw, a spring exerting force to swing said toggle in a direction to move said jaw in work-engaging direction, and means cooperating with said spring to increase and decrease the effective length thereof as the leverage of the toggle is increased and decreased.

9. In a chuck, the combination of jaws, oscillatory means, toggles between said jaws and said oscillatory means, and cantilever spring means extending lengthwise of said toggle normally urging said toggles and jaws into work-engaging position, said oscillatory means insuring coordinated movement of said toggles with attendant uniformity of said jaws toward the work.

10. A chuck comprising, in combination, a rotatable element, jaws, toggles between said rotatable element and said jaws thereby to insure uniformity of movement of said jaws toward the work, and cantilever spring means extending lengthwise of said toggle urging rotation of said rotatable element in a direction to move said jaws toward the work.

11. A chuck comprising, in combination, a body, a jaw, a spring, and toggle means between said spring and said jaw, said toggle means effective to control movement of said jaw alternatively either toward or away from the centre of said chuck by spring-actuated movement.

12. A chuck including, a body portion, movable jaws mounted thereon, toggles for moving said jaws, and springs engaging said toggles and so arranged that their pressure upon the toggles varies in inverse ratio to the leverage of the toggles to produce a substantially uniform pressure on the jaws throughout their movement.

13. A chuck including, a body portion, movable jaws mounted thereon, toggles for moving said jaws, a leaf spring for each toggle having one end thereof slidably engaging the toggle while the opposite end thereof is secured to the body of the chuck, said springs being adapted to move the toggles in one direction, and means for moving said toggles in the opposite direction against the springs to load the springs so that their pressure varies in inverse ratio to the leverage of the toggles to produce a substantially uniform pressure on the jaws throughout their movement.

14. A chuck comprising, in combination, a body, a plurality of jaws, toggles connected to said jaws and actuating means for moving said toggles to force the jaws either toward the centre of the chuck for external chucking or away from the centre of said chuck for internal chucking.

15. A chuck including, a body portion, movable jaws mounted thereon, toggles for moving said jaws, said toggles being adapted to assume substantially radial positions, springs engaging said jaws to actuate the same, and other springs engaging said toggles to throw the same out of their radial positions to allow actuation of said jaws by said first-mentioned springs.

16. A chuck including, a body portion, slidable jaws mounted thereon, a rotatable ring mounted on the body of said chuck, toggles connected between said ring and said sliding jaws, whereby the jaws are simultaneously moved, and spring means for actuating said toggles, said toggles operatively reversible alternatively to actuate said jaws toward and from the center of said chuck.

17. A chuck including, a body portion having a plurality of spaced bosses projecting therefrom and provided with curved inner walls, movable jaws mounted on said body portion between said bosses, toggles for moving said jaws, a leaf spring to actuate each toggle, each of said springs having one end thereof engaging the respective toggle, while the other end thereof is fastened to the adjacent one of said bosses, said springs actuating the jaws in one direction, and means for moving said jaws in the opposite direction against the action of said springs whereby the springs are wrapped around the curved walls of the said bosses to vary the working lengths of the springs as they are compressed, whereby the pressure of the springs varies in inverse ratio to the leverage of said toggles.

18. A chuck including, a body portion, movable jaws mounted thereon, a leaf spring for each jaw to actuate the same toward the work, and means whereby the working lengths of said springs are varied as they are compressed and expand to produce a substantially uniform pressure upon the jaws.

19. A chuck including, a body portion, movable jaws mounted thereon, toggles for operating said jaws, a leaf spring for each toggle and having one end thereof engaging the toggle, while the other end thereof is fastened to the chuck body, and means for varying the working lengths of the springs so that the pressure of the springs varies in inverse ratio to the leverage of said toggles.

20. A chuck including, a body portion, movable jaws mounted thereon, toggles for operating said jaws, a leaf spring to actuate each toggle, each of said springs having one end thereof engaging the respective toggle, while the other end thereof is fastened to the chuck body, said springs actuating the jaws in one direction, and means for moving the jaws in the opposite direction against the action of said springs to vary the working lengths of said springs as they are compressed, whereby the pressure of the springs varies in inverse ratio to the leverage of the toggles.

CHARLES R. PRATT.